3,051,703
PROCESS FOR PREPARING Δ9(11)-PREGNANES AND INTERMEDIATES

Carl Djerassi and Albert Bowers, Mexico City, Mex., assignors, by mesne assignments, to Syntex Corporation, a corporation of Panama
No Drawing. Filed Dec. 18, 1959, Ser. No. 860,338
Claims priority, application Mexico Dec. 20, 1958
7 Claims. (Cl. 260—239.55)

This invention relates to certain cyclopentano-phenanthrene derivatives and to a process for the production of the same.

More particularly, it relates to the novel Δ5,9(11),16-pregnatrien-3β-ol-20-one and to Δ9(11),16-allopregnadiene-3β-ol-20-one, described by Djerassi et al. in J. Org. Chem., 16, 1278 (1951).

The new compounds described in the present patent application are valuable intermediates for the manufacture of cortical hormones of high therapeutic value, such as 9α-fluoro-cortisone and 9α-fluoro-hydrocortisone (J. Am. Chem. Soc., 75, 2273 (1953), J. Fried and E. Sabo), and the 16α- and 16β-methyl derivatives, for instance, of the 21-acetate of 9α-fluoro-prednisolone.

Such cortical hormones may be prepared from the intermediates, the production of which is the object of the present invention, for example, by formation of the 16α,17α-epoxide; opening of the epoxide with hydrogen bromide to give the 17α-hydroxy-16β-bromo derivative; removal of the bromine atom by reaction with zinc in acetic acid; formation of the Δ4-3-keto grouping, which in the case of the Δ5,9(11)-compound is achieved by oxidation of the Δ5-3-hydroxy grouping with Jones reagent and rearrangement of the double bond; or, in the case of the 5,6-saturated Δ9(11)-compound, by conventional oxidation at C-3, dibromination at C-2 and C-4, treatment with sodium iodide to obtain the 2-iodo-Δ4-3-ketone, deiodination of the latter; treatment of the resulting Δ4,9(11)-diene with hypobromous acid in accordance with the method of J. Fried and E. Sabo (loc. cit.), to obtain the 9α-fluoro-11β-hydroxy compound; introduction of the 21-acetoxy group by treatment with iodine in the presence of calcium oxide followed by reaction of the 21-iodo compound with potassium acetate; and finally, if desired, oxidation of the 11β-hydroxy group to the 11-keto group.

The aforesaid new intermediates according to the invention can be represented by the following formula:

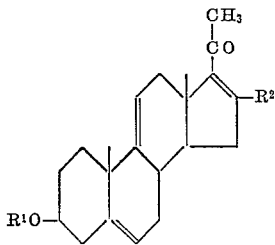

In this formula, R¹ represents hydrogen or the acyl radical of a hydrocarbon carboxylic acid of up to 12 carbon atoms and which may be of straight or branched chain, saturated or unsaturated. Typical for such acyl radicals are the formyl, acetyl, propionyl, benzoyl and trimethyl acetyl groups. R² represents hydrogen, or a lower alkyl group, preferably methyl in either α- or β-configuration at C-16.

It is well known in the art that one of the main difficulties in the manufacture of corticoid hormones is the introduction of an oxygen function at C-11 of the cyclopentanophenanthrene molecule. This operation is still more difficult if it is also desired to introduce a halogen atom at position C-9α, particularly when using as starting materials compounds containing a keto group at position C-12, such as for example hecogenin (22-isoallospirostan-3β-ol-12-one) or botogenin (Δ5-22α-25α-spirosten-3β-ol-12-one). The usual method comprises the bromination of the 12-ketone at C-11, the reaction of the 11-bromo derivative with an alkali, thus achieving the interchange of the bromine by hydroxyl, and rearrangement to the 11-keto-12-hydroxy compound, acetylation, elimination of the 12-acetoxy group by reaction with an alkaline earth metal in liquid ammonia in the presence of methanol, which reaction also causes the simultaneous reduction of the 11-keto group to the 11α-hydroxy group, and finally formation of the 11-tosylate and elimination of the tosyloxy group leading to the introduction of a double bond between C-9 and C-11. When these derivatives are treated in accordance with the method described in Patent No. 2,852,511, they are transformed into the 9α-halo-11β-hydroxy derivatives.

Thus far as has been reported by Marker (J. Am. Chem. Soc., 61, 846 (1939)) and by Hirschmann (J. Am. Chem. Soc., 75, 3252 (1953)), it had not been possible to directly treat steroidal sapogenins with selenium dioxide since degradation of the side chain occurred under formation of unidentified substances (Marker), which made it necessary to protect the spiroketal chain with a bromine atom at position 23 (Hirschmann).

We have now made the surprising discovery that the introduction of the double bond between C-9 and C-11 can be directly achieved in a sapogenin of the above mentioned kind with the aid of selenium dioxide, by varying the hitherto used reaction conditions and treating the the 12-keto compound with selenium dioxide in mixture with t-butanol and in the presence of a base, preferably a tertiary amine such as pyridine, subsequent elimination of the 12-keto group and degradation of the side chain furnishes the aforesaid intermediates in high yields, and these intermediates can then be transformed into cortical hormones of high therapeutic value as described above.

We further made the surprising discovery that the aforesaid side-chain degradation of 9(11)-dehydrotigogenin obtained from hecogenin acetate by the above dehydrogenation method, to the diacetate of Δ9(11);20(22)- allofurostadiene-3β,26-diol may be achieved by treatment with acetic anhydride at approximately 200° C. for a period of time of only 45 to 60 minutes, which modification of the usual method is of general importance for the preparation of pseudo-sapogenins.

In view of the fact that, for instance, hecogenin is easily obtained from plants of the sisal type, which exist abundantly in the south of Mexico and in Central America, the process according to the invention which provides for the conversion of these sapogenins into the above mentioned therapeutically valuable corticoids, among them the 16α- and 16β-methyl-derivatives of the 21-acetate of 9α-fluoro-prednisolone, is of great industrial importance.

In the Reaction Diagram I shown below there is illustrated the new process according to the invention applied to the acetate of botogenin or correllogenin acetate (Δ5-22α-25b-spirosten-3β-ol-12-one acetate) described in Chemical Abstracts, 51, 8375(d) on the one hand, or to hecogenin acetate (22-iso-allospirostan-3β-ol-12-one-acetate) on the other hand. In the formulas Ac represents the acyl radical of a hydrocarbon carboxylic acid having up to 12 carbon atoms, R is a member of the group consisting of hydrogen and the aforesaid acyl radical, and Q is selected from the group consisting of

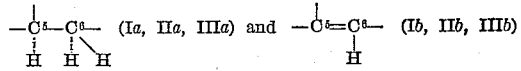

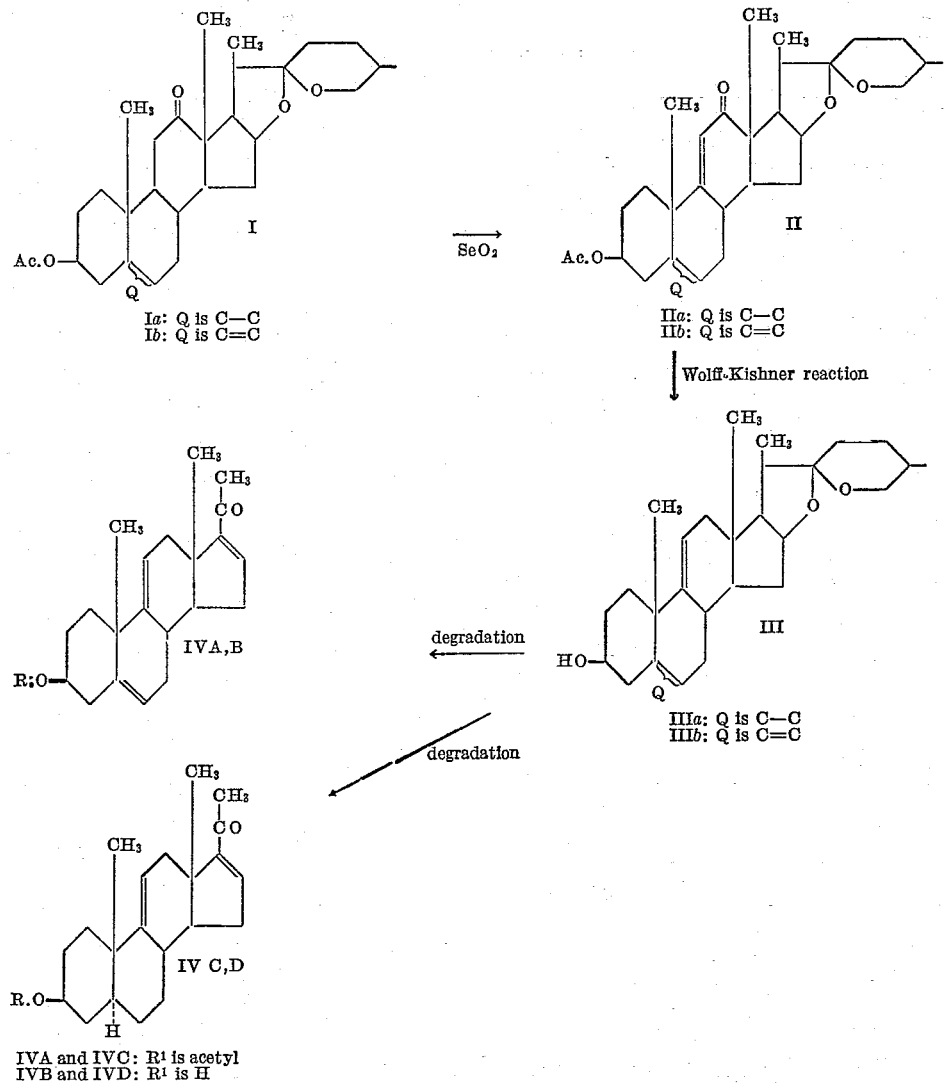

IVA and IVC: R¹ is acetyl
IVB and IVD: R¹ is H

In one case we started from $\Delta^5$-22α-25a-and/or $\Delta^5$-22α-25b-spirosten-3β-ol-12-one acetate (Ib) or another ester as defined above which on treatment with selenium dioxide in mixture with an organic solvent produced $\Delta^{5,9(11)}$-22α-25a- and/or $\Delta^{5,9(11)}$-22α-25b-spirostadien-3β-ol-12-one acetate (IIb). The latter compound was subjected to a Wolff-Kishner reaction in order to remove the 12-keto group, thus giving $\Delta^{5,9(11)}$-22α-25a- and/or -25b-spirostadien-3β-ol (III), the side chain of which was subjected to degradation to produce the desired $\Delta^{5,9(11),16}$-pregnatrien-3β-ol-20-one acetate (IVA) in which R is acetyl. Saponification of this compound afforded the free compound $\Delta^{5,9(11),16}$-pregnatrien-3β-ol-20-one (IVB), Q being

in all aforegoing compounds.

More particularly, a solution of $\Delta^5$-22α-25a- and/or -25b-spirosten-3β-ol-12-one acetate (Ib) in t-butanol was treated with selenium dioxide at the reflux temperature and in the presence of catalytic amounts of a nitrogen organic base, such as trimethylamine or preferably pyridine. There was thus obtained the aforesaid $\Delta^{5,9(11)}$-22α-25a- and/or -25b-spirostadien-3β-ol-12-one acetate (IIb).

The reaction of hecogenin acetate with solenium dioxide under the conditions described above, furnished in good yield $\Delta^{9(11)}$-22 - iso - allospirosten - 3β - ol - 12-one acetate (IIa). The latter was reduced by the Wolff-Kishner reaction to 9(11)-dehydro-tigogenin (IIIa), and upon subsequent oxidation with chromic acid, there was obtained the 3-acetate-16 - γ - methyl - δ - acetoxyvalerate of $\Delta^{9(11)}$-allopregnene-3β,16β-diol-20-one, which was treated with potassium hydroxide and then acetylated to produce the known acetate of $\Delta^{9(11),16}$-allopregnadien-3β - ol - 20 - one (IVC). Saponification by conventional methods yielded the free compound (IVD). In compounds IVC and IVD, Q represents the grouping

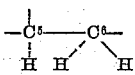

The methyl or another lower alkyl radical is introduced into the aforesaid intermediates IVA, IVB, IVC or IVD in a conventional manner, for instance by refluxing one of the above-described compounds IVA, IVB, IVC or IVD, with the respective alkyl magnesium bromide, for instance, methyl magnesium bromide, in benzene solution; the 17α-hydroxyl group is then introduced into the resulting 16α-(lower alkyl)-$\Delta^{9(11)}$-allopregnen-3β-ol-20-one by the method of Gallagher described in J. Am. Chem. Soc., 74, 483 (1952).

Further reactions required to obtain the corresponding corticoids have been described hereinbefore.

The process of the present invention may be modified within wide limits, both with regard to the reagents and solvents employed, as with regard to the conditions of temperature and time for the respective reactions. For example: one may start from any ester of hecogenin other than the acetate, the dehydrogenation at C–9,11 of hecogenin acetate may be effected in a tertiary aliphatic alcohol different from ter-butanol, such as ter-amyl alcohol; the oxidation with chromic acid may be carried out with using its complex with pyridine.

Alternatively, 16-methyl-corticoids can also be obtained via 16-methyl-$\Delta^{9(11),16}$-allopregnadien-3$\beta$-ol-20-one. The latter is produced from compound IVA by addition of diazomethane to the C–16,17 double bond IVA and thermal decomposition of the resulting pyrazoline. 16-methyl-$\Delta^{9(11),16}$-pregnadien-3$\beta$-ol-20-one is then hydrogenated and the resulting 16$\alpha$-methyl-$\Delta^{9(11)}$-pregnan-3$\beta$-ol-20-one is further treated as mentioned hereinbefore in order to obtain the desired 16-methyl corticoids.

The following examples serve to illustrate the invention further without limiting the scope of the same:

Example I 2.7 g. of selenium dioxide was added to a solution of 5 g. of $\Delta^5$-25D-spirosten-3$\beta$-ol-12-one acetate in 240 cc. of t-butanol containing 0.8 cc. of pyridine and the mixture was refluxed for 66 hours under an atmosphere of nitrogen. The reaction mixture was filtered through a layer 1 cm. thick of celite and the solvent was removed by evaporation under reduced pressure. By chromatography of the residue there was obtained $\Delta^{5,9(11)}$-22$\alpha$-25$\alpha$-spirostadien-3$\beta$-ol-12-one acetate. The yield in this reaction was of 50% and there was recovered 20% of unreacted starting compound.

A solution of 4.5 g. of $\Delta^{5,9(11)}$-25D-spirostadien-3$\beta$-ol-12-one acetate in 105 cc. of ethylene glycol was mixed with 3 cc. of 85% hydrazine hydrate and refluxed for 1 hour. The reaction mixture was cooled, mixed with a solution of 9.2 g. of potassium hydroxide in 10 cc. of water, heated until the temperature of the reaction mixture reached 195° and then refluxed for 8 hours and cooled again. After diluting with water the mixture was acidified with hydrochloric acid and the product was extracted with chloroform. The extract was washed to neutral, dried over anhydrous sodium sulfate and the solvent was removed by distillation under reduced pressure. The residue thus obtained was acetylated by reaction with acetic anhydride in pyridine, refluxing for 1 hour. The reaction mixture was diluted with water and the product which precipitated was collected by filtration and recrystallized from chloroform-methanol, thus yielding the $\Delta^{9(11)}$-derivative without the keto function at C–12.

The compound obtained above (3.6 g.) was heated with 18 cc. of acetic anhydride at 195° C. for 8 hours.

The cooled solution was diluted with an excess of water and kept standing until the unreacted acetic anhydride had hydrolyzed.

The above product was extracted with ether, the extract was washed to neutral and evaporated to dryness. The residue was dissolved in a mixture of 50 cc. of acetic acid and 10 cc. of water, treated at 15° C. with a solution of 2.5 g. of chromium trioxide in 3 cc. of water and kept for 2 hours. The reaction mixture was diluted with water and the product was extracted with ether, washed to neutral, dried over anhydrous sodium sulfate and the ether was removed by evaporation. The residue was dissolved in 60 cc. of acetone, treated with a solution of 750 mg. of potassium hydroxide in 15 cc. of water and the mixture was refluxed for 5 hours. It was then diluted with water and the precipitate formed was collected and recrystallized from methanol-water, thus furnishing $\Delta^{5,9(11),16}$-pregnatrien-3$\beta$-ol-20-one.

Example II

A mixture of 20 g. of hecogenin acetate, 10 g. of recently sublimed selenium dioxide, 500 cc. of t-butanol and a few drops of pyridine was refluxed under an atmosphere of nitrogen for 96 hours, filtered through celite and evaporated to dryness under reduced pressure. The residue was decolorized by refluxing in acetone solution with decolorizing charcoal and after evaporating the filtered acetone solution, the crude product was purified by chromatography on neutral alumina, thus giving the 3-acetate of $\Delta^{9(11)}$-22-iso-allospirosten-3$\beta$-ol-12-one, namely the acetate of $\Delta^{9(11)}$-dehydro-hecogenin, identical with an authentic sample of the material, prepared in accordance with the method of Djerassi et al. (loc. cit.).

A mixture of 15.5 g. of the above compound, 300 cc. of ethyleneglycol and 9 cc. of hydrazine hydrate was refluxed for 1 hour, cooled, treated with 30 g. of potassium hydroxide in 30 cc. of water, heated in the open flask until the temperature reached 195° C. and the mixture was then refluxed for 4 hours. After cooling, the mixture was diluted with water, acidified with hydrochloric acid, extracted with chloroform and the extract was washed with water and the solvent was evaporated. By chromatography of the residue on neutral alumina followed by crystallization of the solid fractions from methanol-chloroform there was obtained $\Delta^{9(11)}$-22-iso-allospirosten-3$\beta$-ol, identical to an authentic sample.

A mixture of 10 g. of the above compound and 50 cc. of acetic anhydride was heated in a sealed tube at 200° C. for 45 minutes; the cooled mixture was poured into water, the excess of anhydride was allowed to hydrolyze and the product was extracted with ethyl acetate, washed with 5% aqueous sodium bicarbonate solution and water, dried over anhydrous sodium sulfate and evaporated to dryness, thus giving an oily residue consisting of the crude diacetate of $\Delta^{9(11),20(22)}$-allofurostadiene-3$\beta$,26-diol.

The above oil was dissolved in 160 cc. of acetic acid and 30 cc. of water and treated at 15° C. under stirring with a solution of 6 g. of chromium trioxide in a mixture of 80 cc. of acetic acid and 8 cc. of water. The mixture was kept for 2 hours at room temperature and then diluted with water and extracted with chloroform; the extract was washed with aqueous sodium bicarbonate solution and water, and evaporated to dryness, thus giving the 3-acetate-16-$\gamma$-methyl-$\delta$-acetoxyvalerate of $\Delta^{9(11)}$-allopregnene-3$\beta$,16$\beta$-diol-20-one in crude form.

The above compound was mixed with 60 cc. of acetone, 30 cc. of water and 5 g. of potassium hydroxide and refluxed for 1 hour, cooled, diluted with water and extracted with ether; the extract was washed with water, dried over anhydrous sodium sulfate and the solvent was evaporated. Upon subsequent treatment with 5 cc. of acetic anhydride and 50 cc. of pyridine for 1 hour on the steam bath, precipitation of the product with water and purification by recrystallization from methanol, there was obtained the acetate of $\Delta^{9(11),16}$-allopregnadien-3$\beta$-ol-20 one, identical with an authentic sample of the material. The latter was further treated as described in Example I to obtain the same end products.

Example III $\Delta^{9(11)}$-allospirosten-3$\beta$-ol-12-one propionate was prepared by treatment of hecogenin propionate under the conditions described for $\Delta^{5,9(11)}$-22$\alpha$-25$\alpha$-spirostadien-3$\beta$-ol-12-one acetate, in accordance with the procedure described in Example I above. Hecogenin propionate was obtained from hecogenin by conventional esterification with propionic anhydride.

Example IV $\Delta^{5,9(11)}$-22$\alpha$-25$b$-spirostadien-3$\beta$-ol-12-one acetate was prepared from $\Delta^5$-22$\alpha$-25$b$-spirosten-3$\beta$-ol-12-one acetate, by following the conditions described for the 25$\alpha$-isomer; Wolff-Kishner reduction in accordance with the procedure described for the 25$\alpha$-isomer in Example I yielded $\Delta^{5,9(11)}$-22$\alpha$-25$b$-spirostadien-3$\beta$-ol.

Example V 5 g. of the end product of Example I was treated with 5 cc. of acetic anhydride and 50 cc. of pyridine for one hour on the steam bath; the resulting product was precipitated by dilution with water and the precipitate was purified by recrystallization from methanol; the acetate of $\Delta^{5,9(11),16}$-pregnatrien-3$\beta$-ol-20-one was obtained.

A solution of 7 g. of the acetate of $\Delta^{5,9(11)}$-pregnatrien-3$\beta$-ol-20-one in 200 cc. of an ether solution of diazomethane prepared from 50 g. of nitrosomethyl urea was allowed to react at room temperature for 24 hours and then treated with 5 cc. of acetic acid; the solution was evaporated under reduced pressure in a bath at 40° C. almost to dryness and the residue was crystallized from acetone, thus yielding the 3-acetoxy-pyrazoline, which was decomposed by the thermic procedure described by Wettstein (Helv. Chim. Acta, XXVII, 1803 (1944)), by gradual heating to about 180° C. under vacuum. By recrystallization of the crude product from acetone there was obtained 16 - methyl - $\Delta^{5,9(11),16}$-pregnatrien-3$\beta$-ol-20-one-acetate. Saponification by conventional methods yielded the free 16-methyl-$\Delta^{5,9(11),16}$-pregnatrien-3$\beta$-ol-20-one.

We claim:

1. A process for producing a pregnan-3$\beta$-ol-20-one having double bonds at least between C-9, C-11 and C-16, C-17, comprising the steps of reacting a steroidal sapogenin having a 12-keto group and a 3-acyloxy group of up to 12 carbon atoms, with selenium dioxide in t-butanol and in the presence of a catalytic amount of pyridine to introduce a double bond between C-9 and C-11, reacting the resulting $\Delta^{9(11)}$-intermediate with hydrazine and an alkali metal hydroxide to remove the 12-keto group and degrading the side chain of the resulting reduction product with acetic anhydride so as to introduce a further double bond between C-16 and C-17 and produce the CO.CH$_3$ side chain, of the pregnane end product.

2. The process described in claim 1, characterized in that the degradation of the side chain of the $\Delta^{9(11)}$ intermediate comprises reacting the latter with acetic anhydride at about 200° C. for from about 45 minutes to about 8 hours.

3. The process described in claim 1, characterized in that the starting sapogenin is a botogenin acyl ester in which the acyl group is of a hydrocarbon carboxylic acid of up to 12 carbon atoms and that the end product is $\Delta^{5,9(11),16}$-pregnatrien-3$\beta$-ol-20-one.

4. The process described in claim 1, characterized in that the starting sapogenin is a hecogenin acyl ester in which the acyl group is of a hydrocarbon carboxylic acid of up to 12 carbon atoms, and that the end product is $\Delta^{9(11),16}$-allo-pregnadien-3$\beta$-ol-20-one.

5. The process as described in claim 4, characterized in that the degradation of the side chain of the resulting $\Delta^{9(11)}$-intermediate comprises reacting the latter with acetic anhydride at about 200° C. for about 45 to 60 minutes.

6. $\Delta^{5,9(11)}$-22$\alpha$,25$\alpha$-spirostadien-3$\beta$-ol-12-one acetate.

7. $\Delta^{5,9(11)}$-22$\alpha$-25$b$-spirostadien-3$\beta$-ol-12-one acetate.

References Cited in the file of this patent
UNITED STATES PATENTS

| | | |
|---|---|---|
| 2,870,142 | Wettstein et al. | Jan. 20, 1959 |
| 2,871,246 | Loken | Jan. 27, 1959 |

OTHER REFERENCES

Wall et al.: 77 J.A.C.S. 5665–68 (1955).
Walens et al.: J. Org. Chem. 22, 182–185 (1957).
Mazur: 81 J.A.C.S. 1454–56 (March 1959).